March 31, 1959   R. L. HOLLINGSWORTH   2,879,520
FLUSH VALVE ASSEMBLY
Filed Oct. 14, 1957

INVENTOR
Richard Hollingsworth
BY Gustave Miller
ATTORNEY

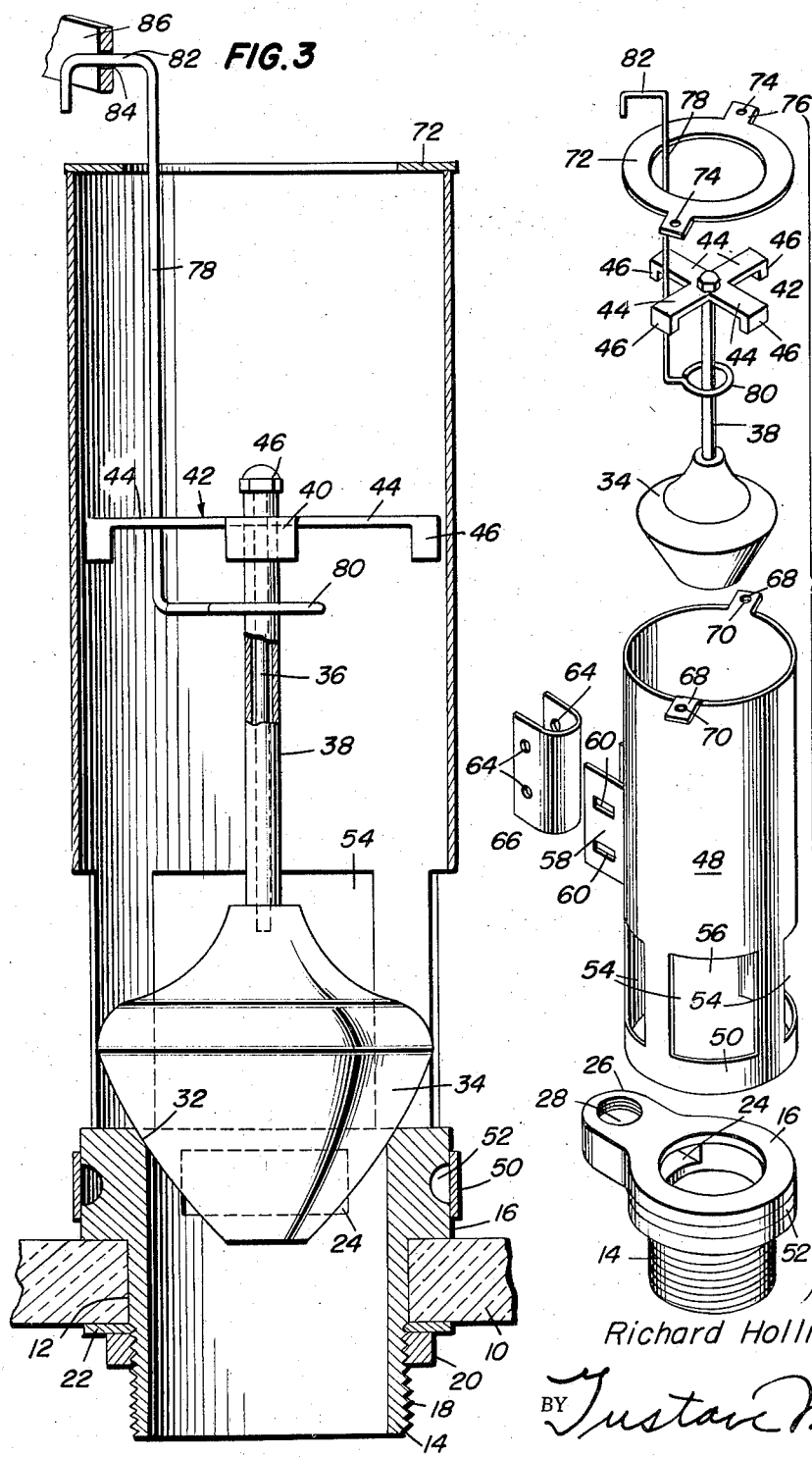

United States Patent Office

2,879,520
Patented Mar. 31, 1959

2,879,520

FLUSH VALVE ASSEMBLY

Richard L. Hollingsworth, Shrewsbury, W. Va.

Application October 14, 1957, Serial No. 689,913

2 Claims. (Cl. 4—56)

This invention relates to flush valve assemblies, and it particularly relates to flush valve assemblies wherein a float valve maintains the drain opening closed until manually lifted therefrom and then floats down with the sinking level of the water in the tank until it comes to rest in closing position over the drain opening.

A great many different types of flush valves have heretofore been produced. However, in spite of the crowded condition of the art, there are still difficulties which have not, until now, been properly overcome. Among the difficulties are the provision of a flush valve assembly which is adapted to easy installation in any type of tank; the provision of a flush valve assembly wherein the float valve is permitted freedom of float movement while being adequately guided at all times; and the provision of a flush valve assembly wherein the float valve is properly balanced to prevent slamming at it is drawn down to the valve seat.

It is, therefore, one object of the present invention to provide a flush valve assembly wherein the float valve is accurately guided throughout its vertical movements.

Another object of the present invention is to provide a flush valve assembly wherein the float valve is properly counterbalanced at all times.

Another object of the present invention is to provide a flush valve assembly which is easy to install in any tank.

Other objects of the present invention are to provide an improved flush valve assembly, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 3 is a side view, partly in section and partly in elevation, of the valve assembly shown in Fig. 1.

Fig. 4 is an exploded, perspective view of the assembly shown in Fig. 3.

Figure 1:
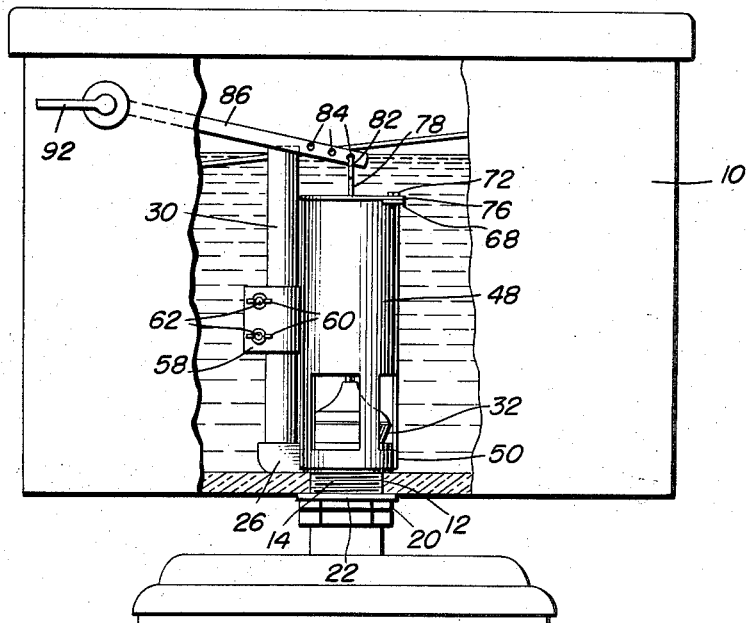
Fig. 1 is a side view, partly broken away, of a flush valve tank, showing a valve assembly embodying the present invention; the assembly being shown in side elevation.
Figure 2:
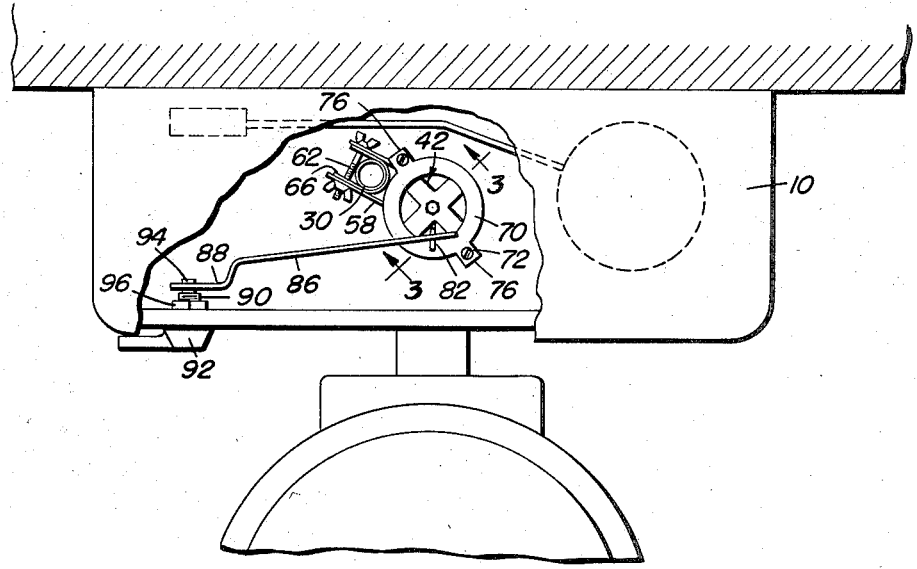
Fig. 2 is a top plan view of the assembly shown in Fig. 1.

Referring now in greater detail to the drawings wherein similar reference characters refer to similar parts, there is shown a tank 10 having a bottom opening 12 through which extends a drain pipe 14. The drain pipe 14 is provided with a flange 16 at its open top end and external threads 18 at its lower end. The threads 18 receive a nut 20 which clamps the pipe 14 in place by exerting clamping pressure on the tank bottom between a washer 22 and the flange 16.

The flange 16 is provided with a lateral opening 24 leading into the hollow interior of a socket portion 26. The socket 26 is provided with a top opening 28 to receive the lower end of an overflow pipe 30 of the ordinary type.

The open top of the drain pipe 14, within the confines of flange 16, is beveled to provide a valve seat 32 for a float valve 34 of generally conical bottom shape. The float valve 34 is provided at its top with a threaded opening to threadedly receive the threaded bottom end of a rod 36. This rod 36 extends through a tube 38 which, in turn, extends up from the top of the float 34. The rod 36 passes up beyond the top of the tube 38 and has swivelly mounted thereon, above the tube 38, the hub 40 of a guide member 42. The guide member 42 comprises four radial arms 44, each arm having a down-turned flange 46 at its outer end, and is held in place on the rod 36 by a nut 46.

The float valve 34 and its component parts are vertically movable within a cylindrical housing 48 which is positioned above the drain pipe 14. The housing 48 is held in place by telescoping its lower end 50 around the peripheral groove 52 on the flange 16 of the pipe 14 and clamping it thereto. The lower portion of the housing 48, above the lower end 50, is provided with cut-outs 54 spaced circumferentially around the housing 48 to permit water from the tank to flow into and out of the housing 48 even when the water level is low. A slot 56 is additionally provided to accommodate the socket 26 when the housing 48 fits over the flange 16 of the drain pipe.

The housing 48 is provided, intermediate its length, with a bracket 58 having transverse, elongated slots 60 therein. These slots 60 receive bolts 62 which also pass through mating holes 64 on each arm of a U-shaped adapter member 66. The adapter member 66 clamps around the intermediate portion of the overflow pipe 30 whereby the pipe 30 is supported in upright position. The elongated nature of slots 60 permits lateral adjustment of the adapter 66 to compensate for variations in the position of the pipe 30.

At its open upper end, the housing 48 is provided with a pair of oppositely, outwardly extending radial ears or flanges 68 each having a hole 70 therethrough. A ring 72 is adapted to seat on the upper end of the housing 48, this ring being held in place by threaded studs 72 passing through the holes 70 in ears 68 and through mating holes 74 in ears 76 on the ring 72. The ring 72 itself extends radially inward of the upper edge of the housing 48, as best seen in Fig. 3, so that it acts as a stop for the vertical movement of guide 42. By making the ring 72 releasable, the float and guide assembly can be removed from the top of the housing when desired.

For the purpose of lifting the float valve 34 from its valve seat, there is provided a rod 78 having a ring portion 80 on its lower end and a hook portion 82 on its upper end. The ring portion 80 is slidable along the tube 38 and is adapted to abut against the underside of the guide member 42 to exert a lifting action on the float valve assembly. The hoop portion 82 is adjustably received in one of the openings 84 on the end of a lever 86. The opening 84 into which the hook portion 82 is set determines the stroke of the mechanism. The lever 86 is itself provided with an offset portion 88 at its opposite end, and through a hole in this offset portion 88 extends the stem 90 of a manually actuatable handle 92. The stem 90 has a flange 94 to hold the lever in place and is provided with a threaded portion to receive a locking nut 96 within the tank.

In operation, when water is to be released from the tank 10, the handle 92 is turned to actuate the lever 86 to pull up on the lifter rod 78. This pulls ring portion 80 up to abut against the underside of guide member 42, after which upon continued upward motion of the ring 80, it lifts the float valve assembly up from the seat 32. The ring 72 acts to limit the upward motion of the guide member 42. However, the bent flanges 46 on the arms or vanes 44 prevent jamming against ring 72. After the handle 92 is released, the lever 86 falls back and the ring portion 80 immediately falls down. The float 34 then gradually moves down toward its seat as the water level decreases with continual drainage through pipe 14. During both the upward and downward movement of the valve, the guide member 42 acts to center the movement of the valve within the housing 48. In addition, during the descent of the valve, its free floating movement is counterbalanced by the guide member 42, the swivelling of which causes sufficient turbulence within the housing 48 above the water entrance openings 54 to avoid a precipitous descent of the valve. This is especially important as the valve nears its seat 32 since the suction caused by the venturi action of the water as it flows through the pipe 14 tends to cause the float to slam against the seat, thereby forming a leak proof vacuum type seal.

It is also possible to use this valve and valve housing assembly without a drain pipe constructed in the manner shown at 14. Although the use of such a drain pipe is preferable, it is possible to merely center the housing 48 over an opening in the bottom of the tank. The adjustable bracket 58 can then be tightened around the ordinary overflow pipe already in the tank to hold the housing in position. Any ordinary drain pipe can then be led into the lower end of the housing through the hole in the bottom of the tank.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In combination, a base, a vertical passage through said base, an outwardly-extending peripheral flange at the upper end of said base, a valve seat encompassed by said flange, a generally elongated vertical cylindrical housing with water entrance openings only in the lower portion thereof and having its lower end frictionally supported by said peripheral flange on said base, a float valve vertically movable in said housing toward and away from said valve seat, a rod connected to the upper end of said float valve, said rod being encompassed by a tubular protective sleeve fixedly clamped to said valve and said valve rod, a guide member comprised of a swivelled cross shaped member having radially extending arms with downturned ends rotatable on said sleeve adjacent the top thereof, on said rod above said sleeve, and a manually actuatable lifting means guided about said tubular protective sleeve below said guide and engageable therewith for lifting said float valve from said valve seat within said housing.

2. The structure of claim 1 wherein the upper end of said housing is provided with laterally extending horizontal apertured ears, and a limit stop comprised of a ring having an internal diameter less than the diameter of said float valve and having corresponding laterally extending apertured ears is seated on top of said housing to limit vertical movement of said float valve upwardly in said housing and threaded studs extend through the apertures in said corresponding ears to secure said limit stop in position.

References Cited in the file of this patent

UNITED STATES PATENTS

| | | |
|---|---|---|
| 1,990,207 | Ruff | Feb. 5, 1935 |
| 2,688,140 | Schlatter | Sept. 7, 1954 |
| 2,747,198 | Clapp | May 29, 1956 |
| 2,788,526 | Blain | Apr. 16, 1957 |